(12) United States Patent
Lo

(10) Patent No.: US 9,724,625 B2
(45) Date of Patent: Aug. 8, 2017

(54) IN-LINE CENTRIFUGE-SEPARATOR PUMP

(71) Applicant: HONEYWELL INTERNATIONAL INC., Morristown, NJ (US)

(72) Inventor: Charles Lo, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 309 days.

(21) Appl. No.: 14/686,165

(22) Filed: Apr. 14, 2015

(65) Prior Publication Data

US 2017/0056789 A1    Mar. 2, 2017

(51) Int. Cl.
| | |
|---|---|
| *B01D 45/14* | (2006.01) |
| *B01D 19/00* | (2006.01) |
| *F04D 7/02* | (2006.01) |
| *B64D 37/34* | (2006.01) |
| *B64D 37/32* | (2006.01) |

(52) U.S. Cl.
CPC ..... *B01D 19/0057* (2013.01); *B01D 19/0005* (2013.01); *B01D 45/14* (2013.01); *B64D 37/32* (2013.01); *B64D 37/34* (2013.01); *F04D 7/02* (2013.01)

(58) Field of Classification Search
CPC ..... B01D 45/12; B01D 45/14; B01D 19/0057
USPC .......................... 55/400, 406, 408
See application file for complete search history.

(56) References Cited

U.S. PATENT DOCUMENTS

| | | | |
|---|---|---|---|
| 2,417,747 A | * | 3/1947 | Flowers ................ B04B 1/08 494/68 |
| 2,575,568 A | | 11/1951 | Topanelian, Jr. |
| 3,240,002 A | | 3/1966 | O'Rourke, Jr. et al. |
| 5,735,789 A | | 4/1998 | Borgstrom et al. |
| 2006/0090430 A1 | | 5/2006 | Trautman et al. |
| 2014/0238237 A1 | | 8/2014 | Holm et al. |

OTHER PUBLICATIONS

Schutz, S., et al.; CFD-Based Development of Oil Droplet Separators in Crankcase Ventilation Systems; Institute of Mechanical Process Engineering; EACC 2007 3rd European Automotive CFD Conference, Frankfurt, Germany Jul. 5-6, 2007.

* cited by examiner

*Primary Examiner* — Robert A Hopkins
(74) *Attorney, Agent, or Firm* — Lorenz & Kopf, LLP

(57) ABSTRACT

An in-line centrifuge-separator pump includes a shaft, a shroud, and a plurality of spaced-apart corrugated, and concentrically disposed separator structures. The shaft is adapted to receive a drive torque and is configured, upon receipt thereof, to rotate. The shroud is spaced apart from and is coupled to the shaft to be rotated thereby. The separator structures are at least partially disposed within the shroud and are coupled to both the shroud and the shaft to simultaneously rotate therewith. Each separator structure has a plurality of perforations formed therein.

20 Claims, 8 Drawing Sheets

100
IN-LINE CENTRIFUGE-SEPARATOR PUMP

TECHNICAL FIELD

The present invention generally relates to liquid-gas separation, and more particularly relates to an in-line centrifuge-separator pump that may, if desired, be used in a fuel deoxygenation system.

BACKGROUND

Modern aircraft rely on efficient heat sink options for thermal management. The jet fuel that is supplied to the propulsion engines is often a convenient sink for excess thermal energy, and the energy is efficiently retained in the engine thermodynamic cycle. The presence of molecular oxygen or entrained air limits the ability of fuel to absorb heat beyond approximately 300° F. without undergoing deleterious thermal degradation. Thermal degradation often appears as solid materials which adhere to surfaces and degrades fuel system performance. Moreover, wetted surfaces comprised of metallic materials can further catalyze the reaction of oxygen with fuel and subsequent formation of carbonaceous, coke-like material.

It is possible to substantially reduce coke-based fuel degradation by removing oxygen from the fuel prior to increasing the fuel temperature beyond about 300° F. The process of removing oxygen from the fuel, generally referred to as fuel deoxygenation, is typically accomplished by sparging an inert gas into the fuel. Eventually, the oxygen and inert gas must be removed from the fuel and then, after it is removed, the pressure of the fuel needs to be boosted. Several techniques have been developed to perform this operation. In the context of an aircraft jet engine, however, the options are limited due to size and weight concerns.

Hence, there is a need for device that can quickly and efficiently degas a liquid, such as jet engine fuel, and that is relatively lightweight, relatively compact, and that can boost the pressure of the degassed liquid. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an in-line centrifuge-separator pump includes a shaft, a shroud, and a plurality of spaced-apart corrugated, and concentrically disposed separator structures. The shaft is adapted to receive a drive torque and is configured, upon receipt thereof, to rotate. The shroud is spaced apart from and is coupled to the shaft to be rotated thereby. The separator structures are at least partially disposed within the shroud and are coupled to both the shroud and the shaft to simultaneously rotate therewith. Each separator structure has a plurality of perforations formed therein.

In another embodiment, an in-line centrifuge-separator pump includes a shaft, a shroud, a plurality of spaced-apart corrugated, and concentrically disposed separator structures, and a plurality of vanes. The shaft is adapted to receive a drive torque and is configured, upon receipt thereof, to rotate. The shroud is spaced apart from and is coupled to the shaft to be rotated thereby. The separator structures are at least partially disposed within the shroud. Each separator structure includes a plurality of corrugation peaks and a plurality of corrugation valleys and has a plurality of perforations formed therein. Each of the perforations is disposed on only a corrugation peak or on a corrugation valley. The vanes extend radially from the shaft. Each vane is coupled to the shroud and to each of the separator structures.

In yet another embodiment, an aircraft fuel deoxygenation system includes a boost pump, a contactor-separator, and an in-line centrifuge-separator pump. The boost pump is adapted to receive fuel from a fuel source and inert gas from an inert gas source. The boost pump is configured to mix the fuel and inert gas and supply a fuel/gas mixture. The contactor-separator is coupled to receive the fuel/gas mixture and is configured to remove oxygen from the fuel and thereby generate and supply deoxygenated fuel with entrained purge gas and separated purge gas. The in-line centrifuge-separator pump is coupled to receive the deoxygenated fuel with entrained purge gas and is configured to separate and remove the entrained purge gas from the deoxygenated fuel and supply the deoxygenated fuel and additional purge gas. The centrifuge-separator pump includes a shaft, a shroud, and a plurality of spaced-apart corrugated, and concentrically disposed, separator structures. The shaft is adapted to receive a drive torque and is configured, upon receipt thereof, to rotate. The shroud is spaced apart from and is coupled to the shaft to be rotated thereby. The separator structures are at least partially disposed within the shroud and are coupled to both the shroud and the shaft to simultaneously rotate therewith. Each separator structure has a plurality of perforations formed therein.

Furthermore, other desirable features and characteristics of the in-line centrifuge-separator pump and fuel deoxygenation system and will become apparent from the subsequent detailed description and the appended claims, taken in conjunction with the accompanying drawings and the preceding background.

BRIEF DESCRIPTION OF THE DRAWINGS

The present embodiments will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

With the above in mind, it will be appreciated that although embodiments of an in-line centrifuge-separator pump are described herein in the context of an aircraft fuel deoxygenation system, the various embodiments may be implemented in any one of numerous liquid-gas separation systems, not just liquid deoxygenation systems, not just aircraft fuel systems, and not just aircraft or other types of fuels.

Figure 1:
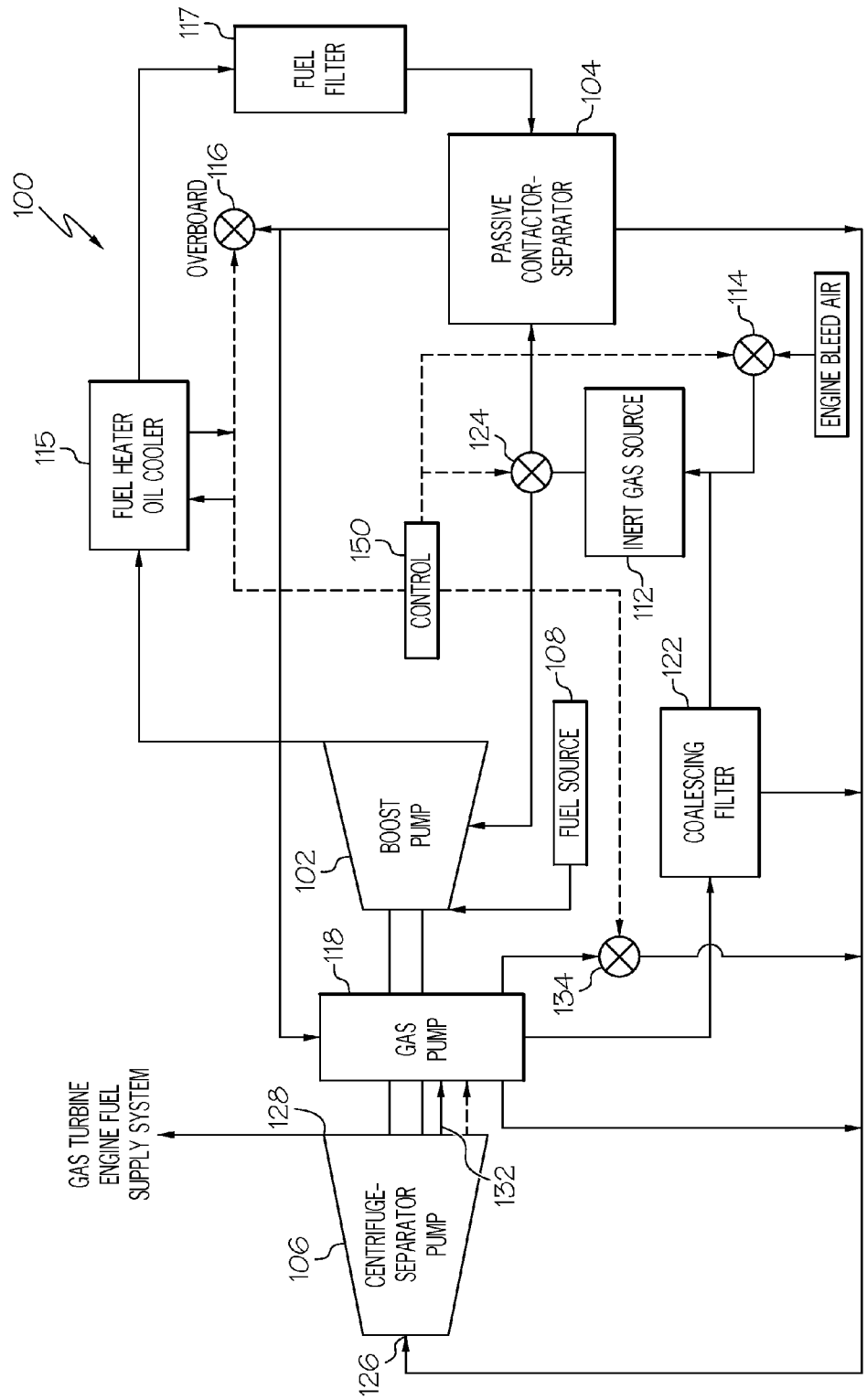
FIG. 1 depicts a schematic representation of one embodiment of an aircraft fuel deoxygenation system.

Referring first to FIG. 1, an embodiment of an aircraft fuel deoxygenation system 100 is depicted. The depicted system 100 includes at least a boost pump 102, a contactor-separator 104, and an in-line centrifuge-separator pump 106. The boost pump 102 is coupled to receive fuel from a fuel source 108 and inert gas from an inert gas source 112. It should be note that the fuel, under normal equilibrium conditions at standard temperature and pressure, will normally have some oxygen dissolved therein. The boost pump 102 is also coupled to receive a drive torque from a non-illustrated torque source, such as a motor or a gas turbine engine, and is configured to uniformly and intimately mix the fuel and inert gas to supply a fuel/gas mixture for subsequent deoxygenation.

It will be appreciated that the fuel source 108 and the inert gas source 112 may be variously configured and implemented. In the depicted embodiment, the fuel source 108 is preferably an onboard aircraft fuel tank that receives and stores fuel for use by various fuel-consuming loads, such as a gas turbine engine. The inert gas source 112 may be a stand-alone source of inert gas, such as an inert gas storage tank or one or more inert gas bottles. Alternatively, the inert gas source 112 may be an inert gas generating system that generates inert gas from, for example, engine bleed air that is selectively supplied from a non-illustrated gas turbine engine via a bleed air inlet valve 114. Some non-limiting examples of such systems include one or more of an on-board inert gas generating system (OBIGGS), a pressure swing adsorption (PSA) system, a catalytic reactor, a plurality of membranes, just to name a few. It will be appreciated that the inert gas is preferably nitrogen ($N_2$), but may be one of the other inert gasses.

It will additionally be appreciated that in some embodiments, such as the one depicted in FIG. 1, the system 100 may additionally include a heat exchanger 115 and a fuel filter 117 between the boost pump 102 and the contactor-separator 104. The heat exchanger 115 is coupled to receive the fuel/gas mixture from the pump 102 and a fluid from a non-illustrated fluid source. The fluid and fluid source may vary, but in one embodiment the fluid is lubricant, such as oil, supplied from a non-illustrated gas turbine engine. In such embodiments, the heat exchanger functions as a fuel heater/oil cooler. Regardless, the heat exchanger 115 is configured to transfer heat from the fluid to the fuel/gas mixture to thereby increase fuel/gas mixture temperature prior to supplying the fuel/gas mixture to the contactor-separator 104, to thereby increase the deoxygenation drive potential and improve deoxygenation efficiency.

The fuel filter 117 is coupled between the heat exchanger 115 and the contactor-separator 104. The fuel filter 117 is configured to remove particulate from the fuel/gas mixture, and break up inert gas bubbles in the fuel/gas mixture into relatively smaller sized bubbles. This latter function will improve the efficiency of the downstream deoxygenation processes.

Whether or not the system 100 includes the heat exchanger 115 and/or the fuel filter 117, the contactor-separator 104 is coupled to receive the fuel/gas mixture and is configured to implement the functions of both a contactor and a separator. In some embodiments, as depicted in FIG. 1, the contactor-separator 104 may also receive inert gas from the inert gas source 112. As is generally known, a contactor functions to intensify the mass-transfer of dissolved oxygen to the inert gas by maximizing the contact surface between the fuel and inert gas, and to providing further mixing of the fuel and inert gas to thereby facilitate efficient mass transfer. A separator functions to separate the deoxygenated fuel and the inert gas/oxygen purge gas that is generated. Thus, the contactor-separator 102, upon receipt of the fuel/gas mixture and, in some embodiments, the inert gas, removes a significant portion of the oxygen from the fuel and thereby generates and supplies deoxygenated fuel (e.g., <2-6% oxygen) and purge gas. The deoxygenated fuel is supplied to the in-line centrifuge-separator pump 106, and the purge gas is directed overboard via an overboard control valve 116, or is directed to a gas pump 118 (described further below), or both.

Figure 2:
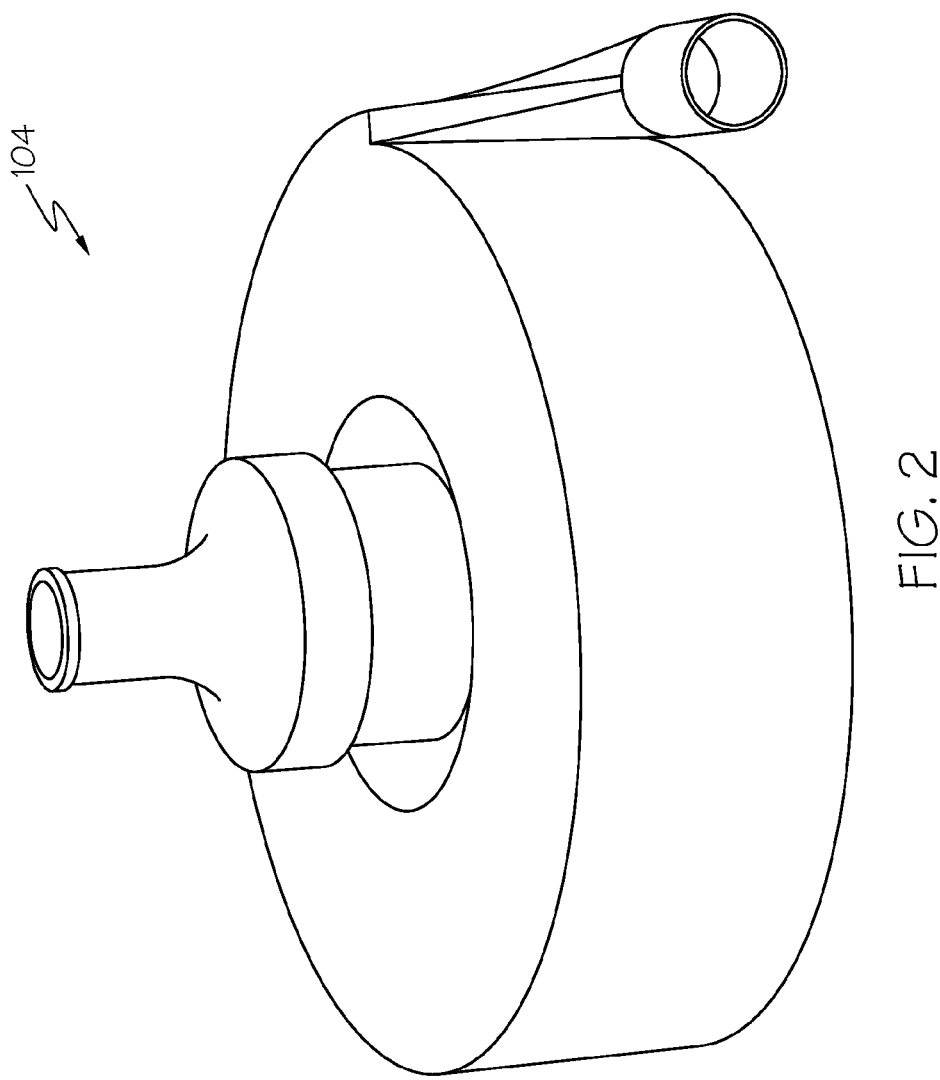
FIGS. 2 and 3 depict plan views of example embodiments of a passive transitional contactor-separator that may be used to implement the system of FIG. 1.
Figure 3:
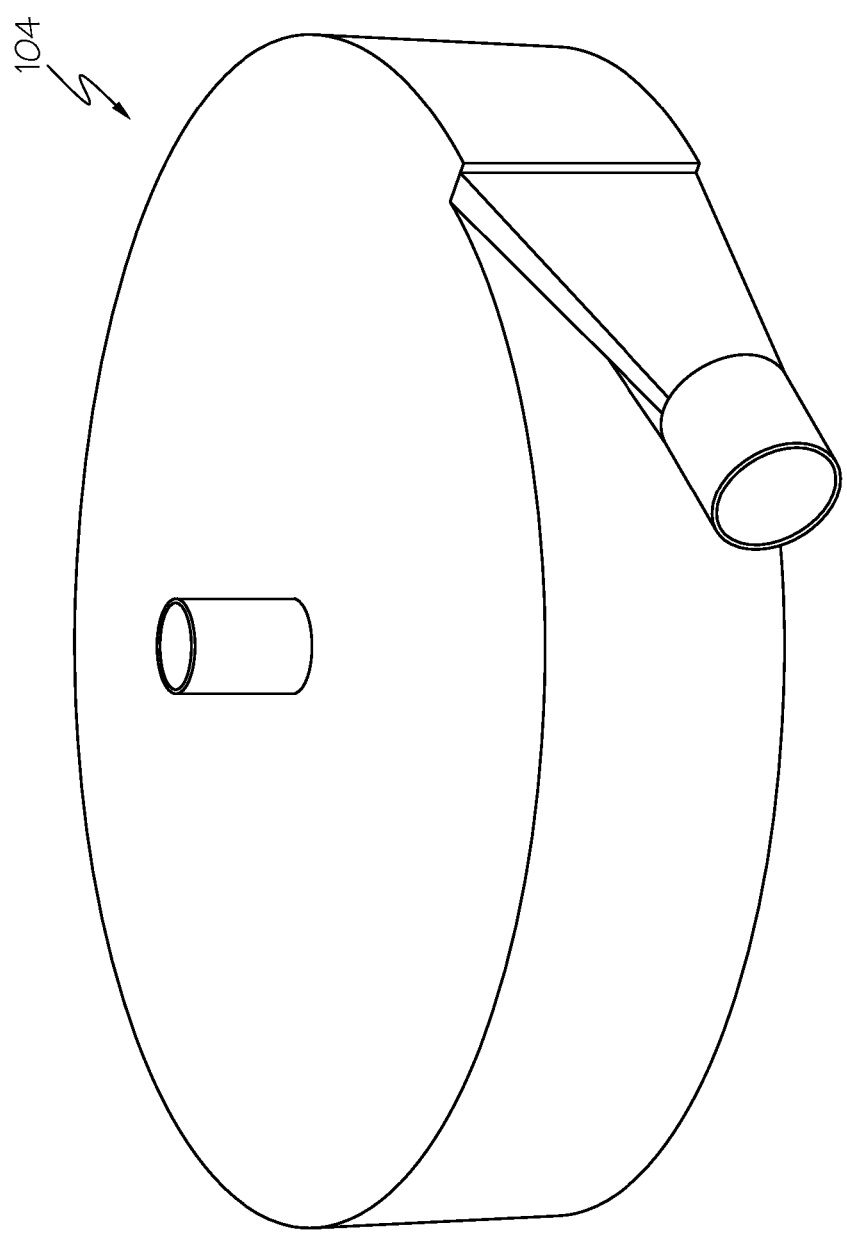
Figure 4:
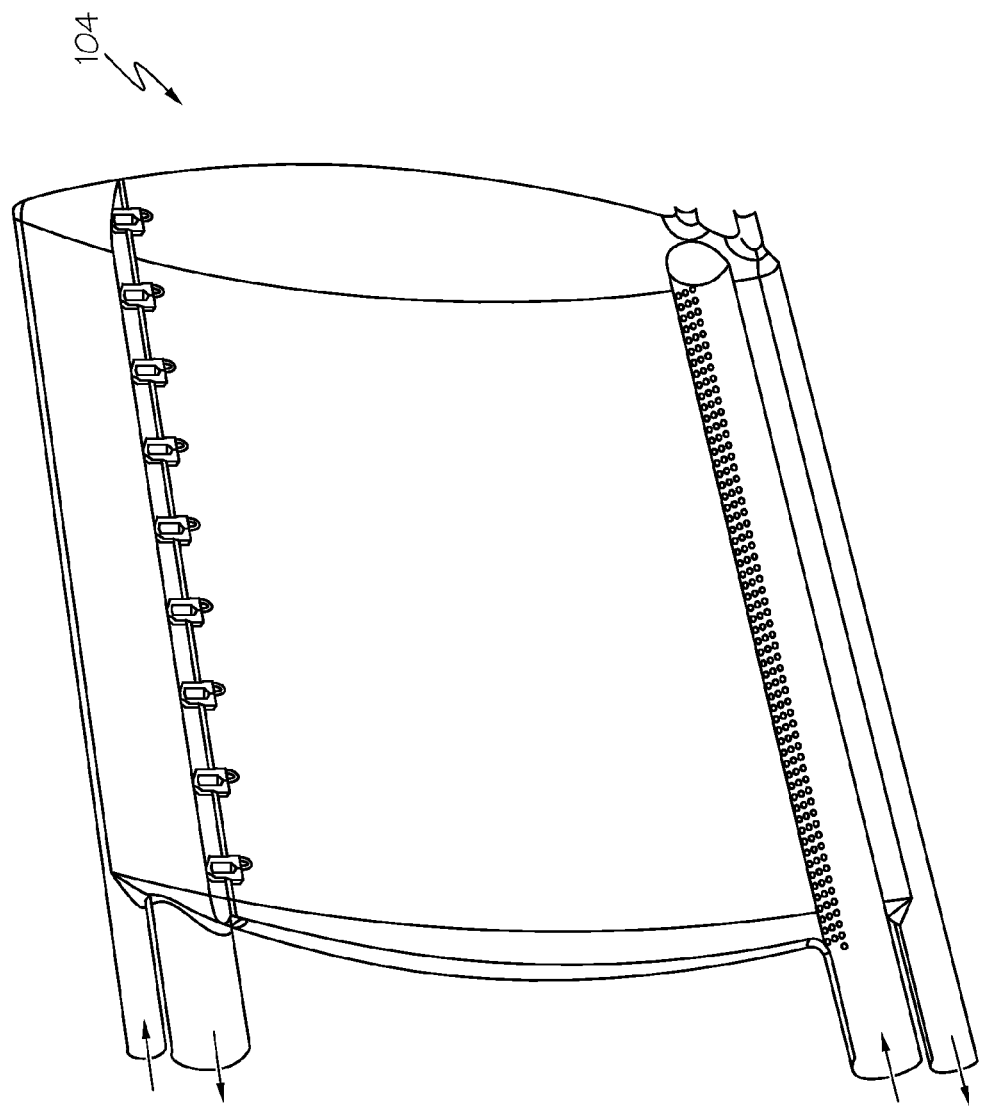
FIG. 4 depicts a cross section plan view of another embodiment of a passive contactor-separator that may be used to implement the system of FIG. 1.

It will be appreciated that the contactor-separator 104 may be variously configured and implemented, but is preferably a passive device. In one embodiment, the passive contactor-separator 104 is configured and implemented using any one of the numerous passive contactor-separators 104 described in co-pending U.S. patent application Ser. No. 14/539,279, filed Nov. 12, 2014, and entitled, "FUEL DEOXYGENATION SYSTEM CONTACTOR-SEPARATOR," or using any one of numerous atomizing contactor-separators 104 described in U.S. patent application Ser. No. 14/570,152, filed Dec. 15, 2014, and entitled, "AIRCRAFT FUEL DEOXYGENATION SYSTEM." The entirety of each of these patent applications is incorporated herein by reference. For completeness, embodiments of the contactor-separators 104 described these applications are depicted herein in FIGS. 2-4. Before proceeding further, it is noted that in some embodiments the system 100 may be implemented using either or both of these contactor-separators 104.

Figure 5:
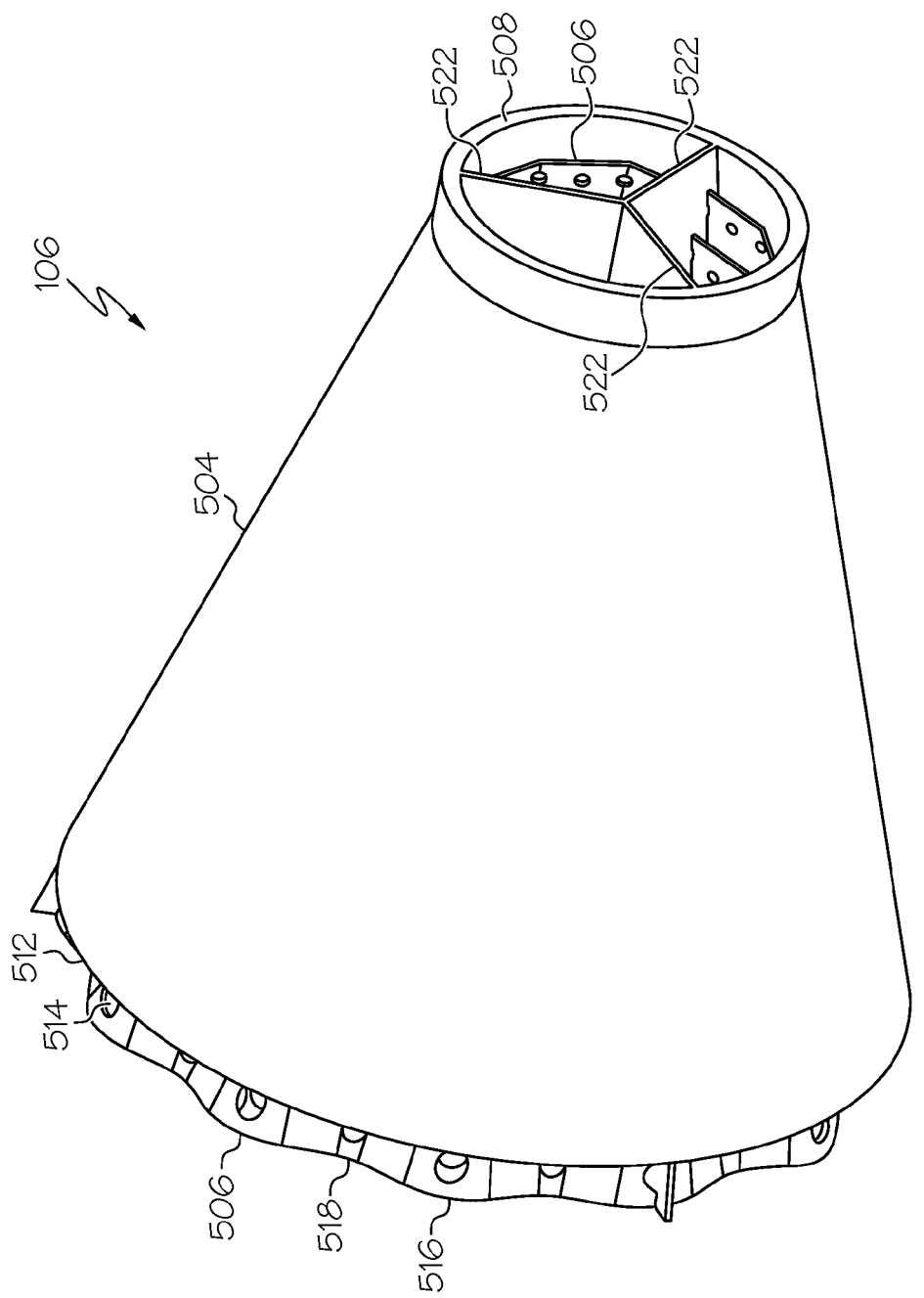
FIGS. 5-8 depict various views of one embodiment of an in-line centrifuge-separator pump that may be used to implement the system of FIG. 1.
Figure 6:
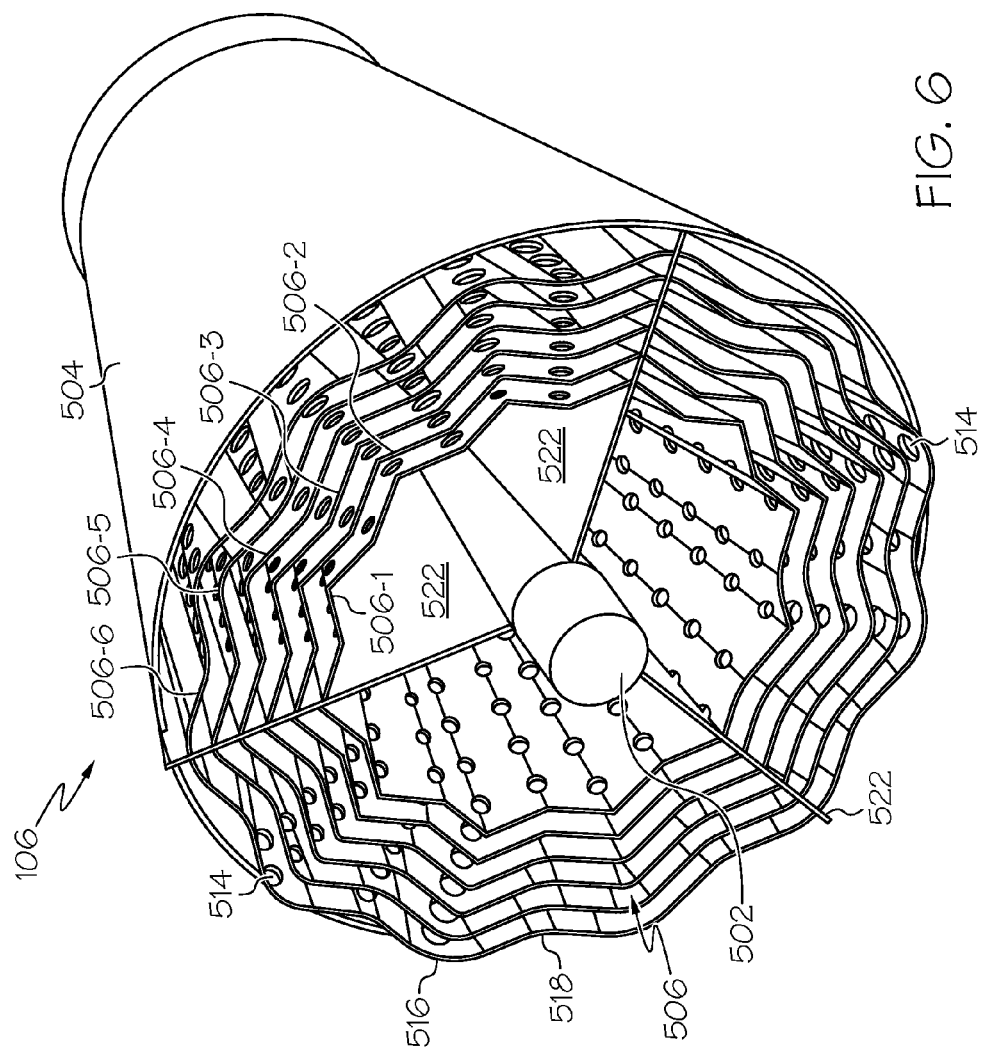
Figure 7:
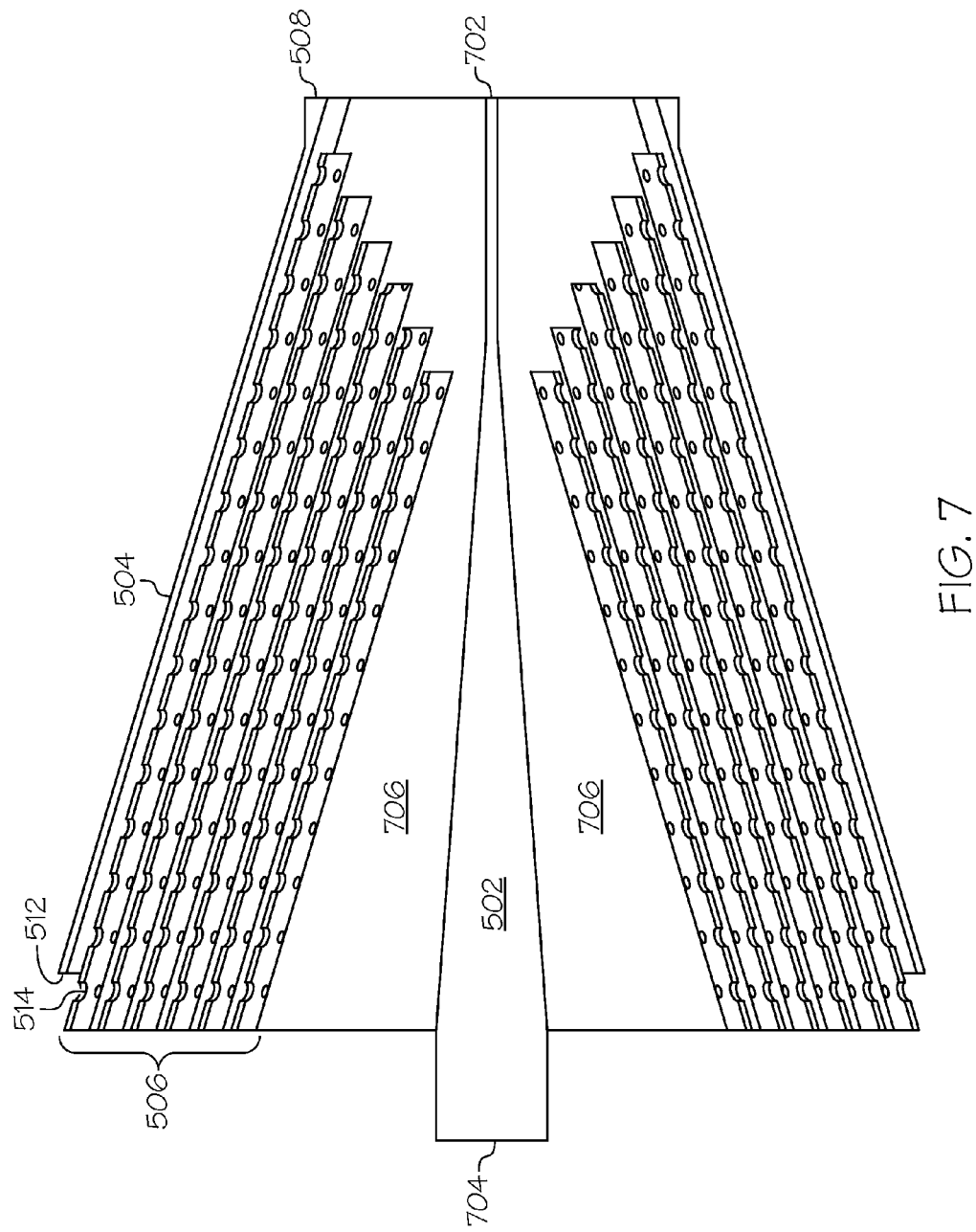
Figure 8:
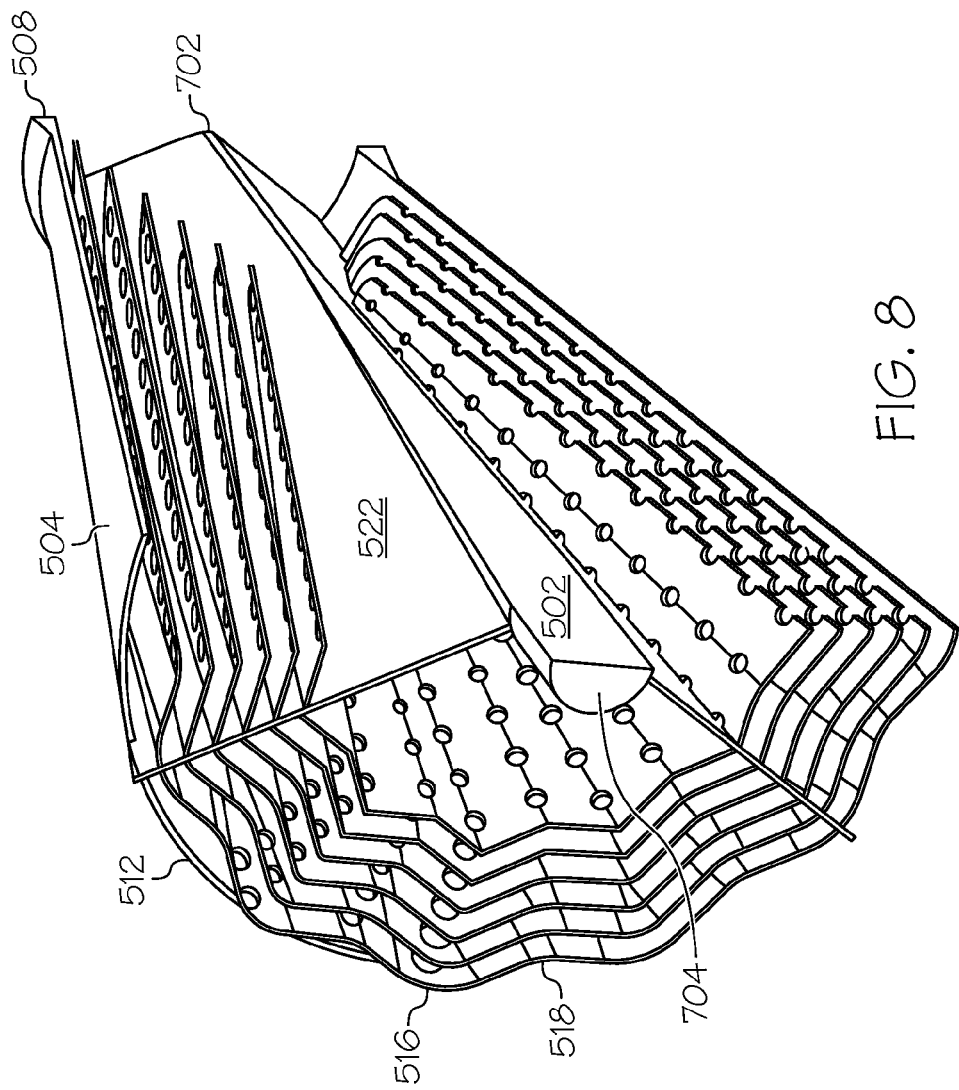

Regardless of how the contactor-separator 104 is specifically implemented, the deoxygenated fuel and entrained purge gas, as noted above and as depicted in FIG. 1, is supplied to the in-line centrifuge-separator pump 106. The in-line centrifuge-separator pump 106 includes a gas/fuel inlet 126, a deoxygenated fuel outlet 128, and a purge gas outlet 132. The in-line centrifuge-separator pump 106 is configured, upon receipt of the deoxygenated fuel and entrained purge gas, to further separate the entrained purge gas from the deoxygenated fuel. The in-line centrifuge-separator pump 106 may be variously configured to implement this function. One particular embodiment, which is depicted in FIGS. 5-7, will be described further below. Before doing so, however, the remainder of the system 100 will be described.

Still referring to FIG. 1, it is seen that the deoxygenated fuel that is discharged from the deoxygenated fuel outlet 128 is supplied to a gas turbine engine supply system for use in a non-illustrated gas turbine engine. Preferably, the deoxygenated fuel is supplied to, for example, a high-pressure fuel pump, such as a gear pump or variable displacement piston pump, one or more additional control valves and components, and various heat sources to absorb waste thermal energy, before being supplied to the gas turbine engine combustor.

As FIG. 1 further depicts, the entrained purge gas that is separated in and discharged from the centrifuge-separator pump 106 is supplied to the gas pump 118. As previously mentioned, the gas pump 118 may also receive purge gas discharged from the contactor-separator 104. The gas pump 118 is configured to increase the pressure of the received purge gas and, when the inert gas source 112 is an inert gas generator, supply the pressurized purge gas to the inert gas source 112. Although the gas pump 118 may be implemented using any one of numerous types of gas pumps 118, it is preferably implemented using a liquid ring vacuum pump (LRVP) (where fuel is used for the sealing fluid), and thus receives a portion of the deoxygenated fuel (illustrated using a dashed line) from the in-line centrifuge-separator pump 106, some spill-over of which is supplied back to the gas/fuel inlet 126 of the in-line centrifuge-separator pump 106. The structure and operation of LRVPs is generally well known in the art, and will thus not be provided. Preferably, as FIG. 1 depicts, the gas pump 118 is coupled to receive a drive torque from the same non-illustrated torque source, such as a motor or a gas turbine engine, as the boost pump 102. It will be appreciated that in other embodiments the torque source may not be the same one that is used for the boost pump 102 and/or the in-line centrifuge-separator pump 106.

The pressurized purge gas that is discharged from the gas pump 118 may include some fuel aerosol. Thus, in some embodiments, a coalescing filter 122 may be coupled between the gas pump 118 and the inert gas source 112. The coalescing filter 122, if includes, is configured to remove any fuel aerosol that may be present in the pressurized purge gas, thereby supplying substantially fuel-free purge gas to the inert gas source 112.

The system 100 may also include a control 150 that is configured to control the positions of various system valves, and thereby control the amount and flow of inert gas and/or purge gas in the system. The number and placement of the system valves may vary, but in the depicted embodiment the system 100 includes the previously mentioned bleed air inlet valve 114, the overboard control valve 116, an inert gas supply control valve 124, and a gas pump fuel discharge control valve 126.

Referring now to FIGS. 5-8, and as was mentioned above, a more detailed description of one embodiment of the in-line centrifuge-separator pump 106 will now be described. The in-line centrifuge-separator pump 106 includes a shaft 502, a shroud 504, and a plurality of separator structures 506. The shaft 502 is coupled to receive a drive torque and configured, upon receipt thereof, to rotate. The shaft 502 is preferably coupled to receive the drive torque from the same non-illustrated torque source, such as a motor or a gas turbine engine, as the boost pump 102 and the gas pump 118. It will be appreciated that in other embodiments the torque source may not be the same one that is used for the boost pump 102 and/or the gas pump 118. As depicted more clearly in FIGS. 7 and 8, the shaft 502 has a first end 702 and a second end 704, and is tapered along at least a portion thereof between its first and second ends 702, 704.

The shroud 504 is spaced apart from and is coupled to the shaft 502 to be rotated thereby. The shroud 504 includes an inlet end 508 and outlet end 512, and has a truncated cone shape. Thus, the inlet end 508 has a smaller diameter than the outlet end 512. As FIGS. 5-8 depict, the shroud 504 also surrounds, or at least partially surrounds, the plurality of separator structures 508.

The separator structures 506 are at least partially disposed within the shroud 504 and are coupled to both the shroud 504 and the shaft 502 to simultaneously rotate therewith. The separator structures 506 include an innermost separator structure 506-1, an outermost separator structure 506-6, and a plurality of intermediate separator structures 506-2, 506-3, 506-4, 506-5, between the innermost and outermost separator structures 506-1, 506-6. Similar to the shroud 504, each of the separator structures 506 also has a truncated cone shape. As such, and as FIG. 7 depicts most clearly, the separator structures 506 successively increase in length from the inner most separator structure 506-1 to the outermost separator structure 506-6. It will be appreciated that although the depicted embodiment includes six separator structures 506 (e.g., 506-1, 506-2 . . . 506-6), the in-line centrifuge-separator 106 may be implemented with more or less than this number of separator structures 506.

Regardless of the number of separator structures 506 that are used, the separator structures 506 are spaced-apart from each other and are concentrically disposed. Moreover, each separator structure 506 is corrugated, and has a plurality of perforations 514 formed therein. More specifically, each separator structure 506 includes a plurality of corrugation peaks 516 and a plurality of corrugation valleys 518, and each of the perforations 514 is disposed on only a corrugation peak 516 or on a corrugation valley 518. Thus, as FIGS. 5-8 depict, a plurality of rows of perforations 514 are formed in each separator structure 506 along each corrugation peak 516 and along each corrugation valley 518.

As will be described in more detail further below, the corrugated separator structures 506 help guide relatively lighter gas along the outer walls of the separator structures 506 to the corrugation valleys 518 and communicate the gas inwardly, via the perforations 514 formed on the corrugation valleys 518. The corrugated separator structures 506 also help guide the relatively heavier liquid along the inner walls of the separator structures 506 to the corrugation peaks 516 and communicate the liquid outwardly, via the perforations 514 formed on the corrugation peaks 516. Also with this structure, once the liquid and gas are separated, there is no chance of remixing.

It was noted above that the separator structures 506 are coupled to both the shroud 504 and the shaft 502. In the depicted embodiment, this coupling is implemented via a plurality of vanes 522. Each of the vanes 522 extends radially from the shaft 502, and each vane 522 is coupled to the shroud 502 and to each of the separator structures 506. Thus, when the shaft 502 receives a drive torque and rotates, the vanes 522 transfer a portion of the torque to the shroud 504 and separator structures 506, causing these to rotate simultaneously with the shaft 502. As FIGS. 5, 6, and 8 also depict, the vanes 522 extend axially from the first end 702 of the shaft 502 toward the second end 704 of the shaft 502, and extend beyond the outlet end 512 of the shroud 504. Near the inlet end 508 of the shroud 504 the vanes 522 act as inducers to accelerate the incoming fluids to the same rotational speed as the shroud 504 and separator structures 506. The portions of the vanes 522 that extend beyond the outlet end 512 of the shroud 504 implement a pump impeller. It will be appreciated that although the depicted embodiment includes three vanes 522, the in-line centrifuge-separator 106 may be implemented with more or less than this number of vanes 522.

Having described the overall structure and the general function of depicted the in-line centrifuge-separator pump 106, a more detailed description of how the in-line centrifuge-separator pump 106 degasses a liquid, such as deoxygenated fuel entrained with purge gas, will now be provided.

The in-line centrifuge-separator pump 106, upon receipt of a drive torque, draws the deoxygenated fuel and entrained purge gas that is discharged from the contactor-separator 104 into the gas/fuel inlet 126. The deoxygenated fuel/entrained purge gas mixture is drawn into the inlet end 508 of the shroud 504 by the vanes 522, which, as noted above, initially act as inducers. The deoxygenated fuel/entrained purge gas mixture travels, within the volumes defined by the spaces between the vanes 522, toward the outlet end 512 of the shroud 504.

As the deoxygenated fuel/entrained purge gas mixture is traveling toward the outlet end 512, the relatively higher density liquid (e.g., fuel) will move outwardly toward the shroud 504 through the perforations 514 that are formed along the corrugation peaks 516. The relatively lower density gas will move toward the volumes 706 (see FIG. 7) that are defined between the innermost separator structure 506-1 and the shaft 502 through the perforations 514 that are formed along the corrugation valleys 518.

The pressure of the relatively higher density liquid increases as it travels along the vanes 522 toward the outlet end 512 of the shroud 504, and as the radii of the shroud 504 and separator structures 506 increase. The relatively higher density liquid (e.g., fuel) that is collected at the outlet end 512 of the shroud 504 is pumped, via the vanes 522 (acting as an impeller) and the deoxygenated fuel outlet 128 (see FIG. 1), to downstream components, such as a gas turbine engine supply system. The relatively lower density purge gas (and a small amount of liquid) is induced into the gas pump 118 via small holes that are formed in a non-illustrated back wall plate and the purge gas outlet 132 (see FIG. 1).

The in-line centrifuge-separator pump 106 described herein can quickly and efficiently degas a liquid, such as jet engine fuel. It is also relatively lightweight, relatively compact, and can boost the pressure of the degassed liquid.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth herein.

What is claimed is:

1. An in-line centrifuge-separator pump, comprising:
   a shaft adapted to receive a drive torque and configured, upon receipt thereof, to rotate;
   a shroud spaced apart from and coupled to the shaft to be rotated thereby; and
   a plurality of spaced-apart corrugated, and concentrically disposed, separator structures at least partially disposed within the shroud and coupled to both the shroud and the shaft to simultaneously rotate therewith, each separator structure having a plurality of perforations formed therein.

2. The in-line centrifuge-separator of claim 1, wherein:
   each separator structure includes a plurality of corrugation peaks and a plurality of corrugation valleys; and
   the each of the perforations is disposed on only a corrugation peak or on a corrugation valley.

3. The in-line centrifuge-separator of claim 1, wherein:
   the separator structures include an innermost separator structure, an outermost separator structure, and a plurality of intermediate separator structures between the innermost and outermost separator structures; and
   the separator structures successively increase in length from the innermost structure to the outermost structure.

4. The in-line centrifuge-separator of claim 1, wherein the shroud and each of the separator structures have a truncated cone shape.

5. The in-line centrifuge-separator of claim 4, wherein:
   the shroud includes an inlet end and outlet end, the inlet end having a smaller diameter than the outlet end.

6. The in-line centrifuge-separator of claim 1, further comprising:
   a plurality of vanes extending radially from the shaft, each vane coupled to the shroud and to each of the separator structures.

7. The in-line centrifuge-separator of claim 6, wherein the vanes extend axially beyond the outlet end of the shroud to implement a pump impeller.

8. The in-line centrifuge-separator of claim 1, wherein:
   the shaft has a first end and a second end; and
   the shaft is tapered along at least a portion of the shaft between its first end and its second end.

9. An in-line centrifuge-separator pump, comprising:
   a shaft adapted to receive a drive torque and configured, upon receipt thereof, to rotate;
   a shroud spaced apart from and coupled to the shaft to be rotated thereby; and
   a plurality of spaced-apart corrugated, and concentrically disposed, separator structures at least partially disposed within the shroud, each separator structure including a plurality of corrugation peaks and a plurality of corrugation valleys and having a plurality of perforations formed therein, each of the perforations disposed on only a corrugation peak or on a corrugation valley; and
   a plurality of vanes extending radially from the shaft, each vane coupled to the shroud and to each of the separator structures.

10. The in-line centrifuge-separator of claim 9, wherein:
    the shroud and each of the separator structures have a truncated cone shape; and
    the shroud includes an inlet end and outlet end, the inlet end having a smaller diameter than the outlet end.

11. The in-line centrifuge-separator of claim 9, wherein the vanes extend axially beyond the outlet end of the shroud to implement a pump impeller.

12. The in-line centrifuge-separator of claim 9, wherein:
the shaft has a first end and a second end; and
the shaft is tapered along at least a portion of the shaft between its first end and its second end.

13. An aircraft fuel deoxygenation system, comprising:
a boost pump adapted to receive fuel from a fuel source and inert gas from an inert gas source, the boost pump configured to mix the fuel and inert gas and supply a fuel/gas mixture;
a contactor-separator coupled to receive the fuel/gas mixture and configured to remove oxygen from the fuel and thereby generate and supply deoxygenated fuel with entrained purge gas and separated purge gas; and
an in-line centrifuge-separator pump coupled to receive the deoxygenated fuel with entrained purge gas and configured to separate and remove the entrained purge gas from the deoxygenated fuel and supply the deoxygenated fuel and additional purge gas, the centrifuge-separator pump comprising:
a shaft adapted to receive a drive torque and configured, upon receipt thereof, to rotate,
a shroud spaced apart from and coupled to the shaft to be rotated thereby, and
a plurality of spaced-apart corrugated, and concentrically disposed, separator structures at least partially disposed within the shroud and coupled to both the shroud and the shaft to simultaneously rotate therewith, each separator structure having a plurality of perforations formed therein.

14. The system of claim 13, wherein:
each separator structure includes a plurality of corrugation peaks and a plurality of corrugation valleys; and
the each of the perforations is disposed on only a corrugation peak or on a corrugation valley.

15. The system of claim 13, wherein:
the separator structures include an innermost separator structure, an outermost separator structure, and a plurality of intermediate separator structures between the innermost and outermost separator structures; and
the separator structures successively increase in length from the innermost structure to the outermost structure.

16. The system of claim 13, wherein the shroud and each of the separator structures have a truncated cone shape.

17. The system of claim 16, wherein:
the shroud includes an inlet end and outlet end, the inlet end having a smaller diameter than the outlet end.

18. The system of claim 13, further comprising:
a plurality of vanes extending radially from the shaft, each vane coupled to the shroud and to each of the separator structures.

19. The system of claim 18, wherein the vanes extend axially beyond the outlet end of the shroud to implement a pump impeller.

20. The system of claim 13, wherein:
the shaft has a first end and a second end; and
the shaft is tapered along at least a portion of the shaft between its first end and its second end.

* * * * *